Patented July 22, 1947

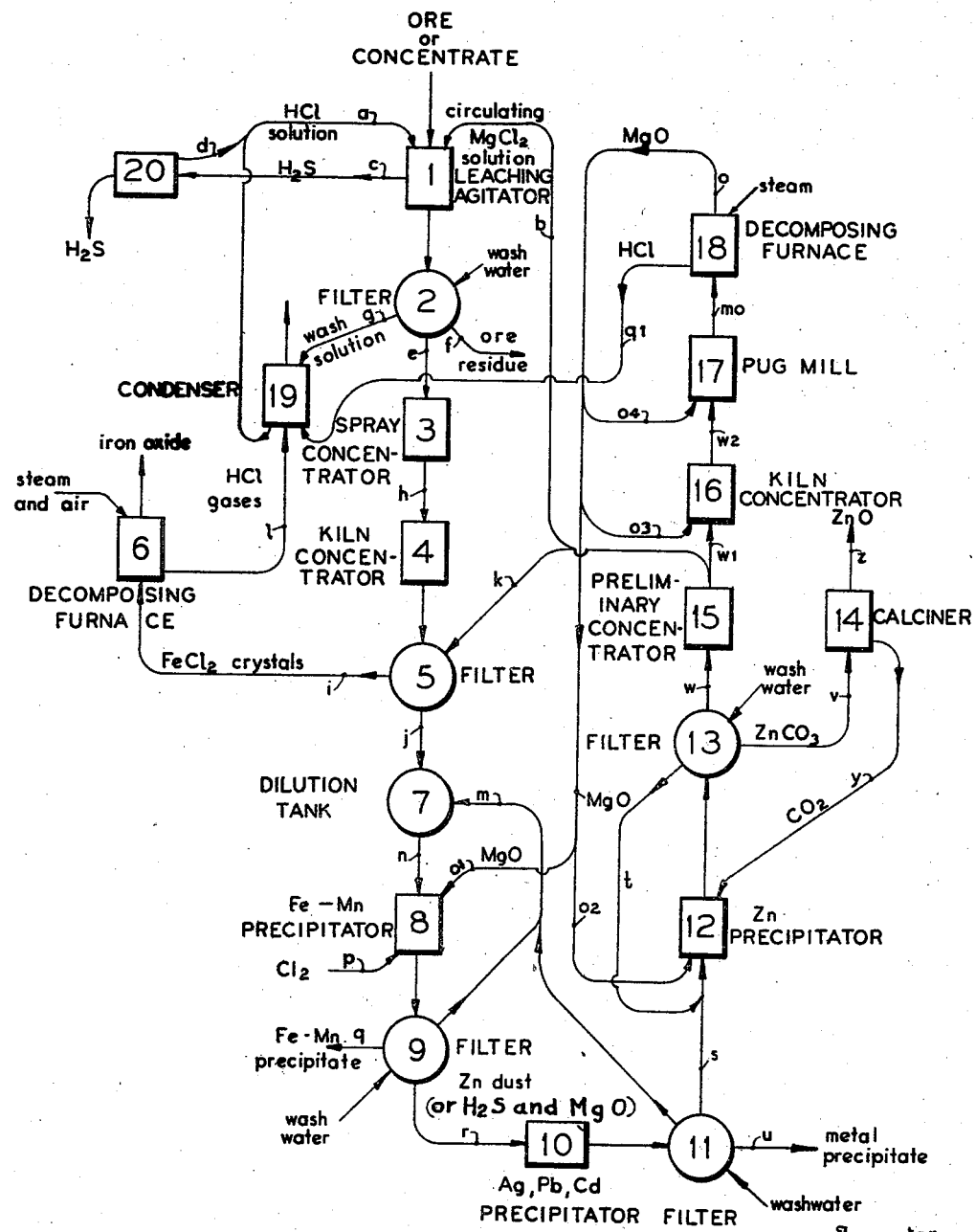

2,424,351

UNITED STATES PATENT OFFICE 2,424,351

PROCESS FOR THE TREATMENT OF MARMATITIC ZINC ORES WITH HCl

Niels C. Christensen, Salt Lake City, Utah, assignor to Combined Metals Reduction Company, Salt Lake City, Utah, a corporation of Utah Application May 1, 1944, Serial No. 533,632

14 Claims. (Cl. 23—147)

This invention relates to the treatment of zinc sulphide ores or concentrates in which the zinc mineral is marmatite or contains such an amount of FeS as to be classed as marmatitic. It is the aim of the process to recover the zinc from such ores as a pure oxide (or sulphide) product and also to recover other valuable metals in the ore, such as Ag, Pb, Cd, in marketable products, and to regenerate and recover the acid and other reagents used in the process so as to provide an economic process for the treatment of such ores.

The process consists in general of six main steps or parts as follows:

I. Leaching the ore with HCl in a hot relatively concentrated $MgCl_2$ solution to dissolve the zinc, iron and cadmium in the zinc mineral and also the lead and silver in the ore.

II. Concentrating the pregnant solution recovered from the leached ore residue to selectively precipitate the iron chloride from the solution.

III. Decomposing the $FeCl_2$ by heating with steam and air to recover the HCl for reuse.

IV. Precipitating the metals remaining in solution to secure a pure $ZnCl_2$—$MgCl_2$ solution.

V. Precipitating the zinc from the $$MgCl_2—ZnCl_2$$

solution with MgO and $CO_2$ to recover the zinc as $ZnCO_3$ (or with MgO and $H_2S$ to recover the zinc as ZnS).

VI. Concentrating a sufficient part of the $MgCl_2$ solution to form a hot syrupy solution and treating this hot concentrated solution with MgO to form a solid $MgCl_2$—MgO product and heating this product with steam to decompose the $MgCl_2$ and form HCl and MgO for reuse in the process.

The method of carrying out the process is illustrated in the accompanying flow sheet and is set forth in more detail in the following description.

I. *Leaching the ore with $MgCl_2$—HCl solution*

The finely ground ore or concentrate is treated with HCl (*a*) (recovered in the process as later described) in a hot concentrated $MgCl_2$ solution (*b*) (continuously circulated in the process as later described) in the leaching agitator 1 to dissolve the marmatite and other soluble sulphides and drive off the sulphur as $H_2S$ (*c*) as indicated in the following chemical equations:

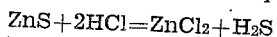
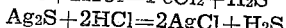
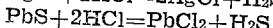
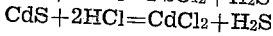

$ZnS+2HCl=ZnCl_2+H_2S$
$FeS+2HCl=FeCl_2+H_2S$
$Ag_2S+2HCl=2AgCl+H_2S$
$PbS+2HCl=PbCl_2+H_2S$
$CdS+2HCl=CdCl_2+H_2S$

When treated with HCl in a hot relatively concentrated solution of $MgCl_2$, the zinc sulfide minerals may be substantially completely dissolved, as indicated above, by the use of a small excess of acid, and a very high recovery of the zinc (and other metals as noted above) may be secured by treatment for thirty minutes to one hour. When such ores are treated with HCl alone, a very large excess of hot concentrated acid and prolonged treatment are required to bring about solution of the zinc; moreover, the resultant solution contains such a large excess of acid, that its neutralization renders a practical use of the process impossible. By leaching in the hot—almost boiling—relatively concentrated $MgCl_2$ solution, the amount of excess acid required is reduced to a minimum and economic use of the process is made possible. It will be obvious to one skilled in the art, that the $MgCl_2$ used in the leaching solution should not be present in an amount such that it will be precipitated out of the solution by the HCl used in leaching the metal values. The maximum amounts of $MgCl_2$ that will be retained in various solutions of HCl have been previously determined and are readily available to the art, being given, for example, by Seidell (cf. "Solubilities of Inorganic and Metal Organic Compounds," 3rd edition, 1940, volume I, page 959). As shown by the data tabulated by Seidell, a saturated HCl solution will not cause precipitation of $MgCl_2$ from a solution where this chloride is present in amounts less than 6.5 gram per liter (at 0° C.). The amount of $MgCl_2$ to be used in a particular case is, therefore, readily determinable.

The $H_2S$ is passed through a condenser 20 to recover any HCl in the gas and the condensate (*d*) is returned to the leaching operation.

The hot pregnant solution thus formed is separated from the ore residue (*f*) and the ore residue is washed with water on the filter 2, the wash solution (*g*) being used to condense the HCl from the decomposing furnace as later described.

II. *Selective precipitation of the $FeCl_2$*

The hot concentrated pregnant solution (*e*) is concentrated to form a hot syrupy solution and thereby precipitate the $FeCl_2$ from solution. This step is preferably carried out in two steps. In the first step the solution (*e*) is given a preliminary concentration in the spray concentrator 3 by counter-current treatment with hot furnace gases. In the second step the partly concentrated solution (*h*) is concentrated to a syrupy solution in the kiln concentrator 4 by treatment in counter-current with hot furnace gases. By this concentration the greater part of the $FeCl_2$ is precipitated in solid form as crystals of

$$FeCl_2—2H_2O$$

The iron chloride crystals (*i*) are separated from residual solution (*j*) and washed with concentrated $MgCl_2$ solution (*k*) on the filter 5, the wash solution being mixed with the residual solution for treatment or sent to the leaching operation in the leaching agitator 1.

III. Decomposition of the FeCl₂

The FeCl₂ crystals (i) from the filter 5 are dried and treated with steam and air (oxygen) in the decomposing furnace 6 to decompose the FeCl₂ and recover the chlorine as HCl for reuse in the process and to recover the iron as an oxide as indicated in the following equation:

$$6FeCl_2 + 6H_2O + O_2 = 2Fe_3O_4 + 12HCl$$
$$4FeCl_2 + 4H_2O + O_2 = 2Fe_2O_3 + 8HCl$$

The decomposition is preferably carried out in a muffle type furnace so as to recover a concentrated HCl gas. If the decomposition is carried out at 550° C. to 650° C. the decomposition is complete and rapid and the iron is recovered as Fe₃O₄. If the decomposition is carried out at higher temperatures with an excess of oxygen the iron may be recovered as Fe₂O₃. If the iron is to be used for the recovery of the iron as sponge iron or as cast iron in a smelting operation, the decomposition is carried out so as to recover Fe₃O₄ and, even if the iron is to be used as a pigment, it is preferable to recover the iron as Fe₃O₄ and treat this product in a suitable kiln to convert it to Fe₂O₃ of the desired shade.

The HCl (l) from the decomposing furnace 6 is condensed with the wash solution (g) from the filter 2 in the condenser 19 to form HCl solution (a) for use in the leaching operation.

IV. Recovery of the Ag—Pb—Cd

The concentrated residual solution (j) from the filter 5 contains the unprecipitated or residual Fe and Mn in the residual solution together with the other metal such as Pb, Ag, Cd. This solution is diluted with wash solutions (m) from subsequent filtering and washing operations in the dilution tank 7. The residual iron and the manganese are precipitated from the diluted solution (n) by treatment with MgO (01) (from the decomposition of MgCl₂ as later described) and Cl₂ (p) as in the spray precipitator 8

$$2FeCl_2 + Cl_2 + 3MgO + 3H_2O = 2Fe(OH)_3 + 3MgCl_2$$
$$MnCl_2 + Cl_2 + 2MgO = MnO_2 + 2MgCl_2$$

The precipitates (q) are separated from the solution (r) and washed on the filter 9, the wash solution being used to dilute the residual solution (j) as previously mentioned. The Ag, Pb, Cd, etc. (i. e. all the metals below Zn in the electromotive series) are then precipitated from solution. These metals (u) may all be precipitated by treatment with zinc dust in the precipitator 10 and separated from the solution and washed on the filter 11 as indicated in the following chemical equations:

$$2AgCl + Zn = 2Ag + ZnCl_2$$
$$PbCl_2 + Zn = Pb + ZnCl_2$$

or may be selectively precipitated, the Ag being first precipitated with Pb, the greater part of the Pb with zinc (used in proper amount) and the Cd and residual Pb with zinc. If desired the Ag, Pb, and Cd may be precipitated as sulphides by treatment of the solution with MgO and H₂S (from the leaching operation) as indicated in the following equations:

$$2AgCl + H_2S + MgO = Ag_2S + MgCl_2 + H_2O$$
$$PbCl_2 + H_2S + MgO = PbS + MgCl_2 + H_2O$$
$$CdCl_2 + H_2S + MgO = CdS + MgCl_2 + H_2O$$

This precipitation may be made selectively by using the amount of MgO chemically equivalent to the metals in the following order: Ag, Pb, Cd.

V. Precipitation of the Zn

The solution (s) from the Ag—Pb—Cd precipitation contains only ZnCl₂ and MgCl₂. This solution is diluted with wash solution (t) from the subsequent filtering and washing operation and treated with finely ground MgO (02) (from the decomposition of MgCl₂ as later described) and CO₂ to precipitate the zinc as ZnCO₃ in the spray precipitator 12 as indicated in the following chemical equation:

$$ZnCl_2 + MgO + CO_2 = ZnCO_3 + MgCl_2$$

The ZnCO₃ (v) is separated from the MgCl₂ solution (w) and washed on the filter 13, the wash solution being used to dilute the solution (s) as described. The zinc carbonate (v) is calcined in the calciner 14 to form ZnO (z) and CO₂, the CO₂ (y) being used to precipitate the zinc as described.

If it is desired to recover the zinc as ZnS for use as pigment, the zinc may be precipitated as ZnS by treatment of the solution (s) with H₂S and finely ground MgO as indicated in the following equation:

$$ZnCl_2 + MgO + H_2S = ZnS + MgCl_2 + H_2O$$

but the preferred method of preparing ZnS in the process is to treat the ZnO (made from ZnCO₃ as described) with H₂S in an aqueous pulp to convert the oxide to the sulphide as indicated in the following equation:

$$ZnO + H_2S = ZnS + H_2O$$

and thereafter drying and heating the ZnS to a red heat to secure the desired pigment properties.

VI. Recovery of the MgO and HCl

The MgCl₂ solution (w) from the zinc precipitation is concentrated in the preliminary concentrator 15 (preferably a multiple effect evaporator) to secure a relatively concentrated MgCl₂ solution one part of which (b) is returned to the leaching operation in the leaching agitator 1 and another part of which (k) is used in washing the FeCl₂ crystals. The remainder of this solution (w1) is mixed with a small amount of MgO (03) from the decomposing furnace 18 and concentrated to a hot syrupy solution (w2) in the kiln concentrator 16 and the hot syrupy solution (w2) is mixed with finely ground MgO (04) from the decomposing furnace 18 in the pug mill 17 to form a solid MgCl₂ MgO product (mo). In accordance with the disclosure in my copending application, Serial No. 518,618, filed January 17, 1944, now issued as Patent 2,413,292, dated December 31, 1946, the hot syrupy MgCl₂ solution from the kiln concentrator 16 is mixed with sufficient finely divided MgO to form a solid mixed product of MgCl₂—MgO which facilitates the subsequent decomposition of the MgCl₂. The amount of MgO required in this operation depends upon the concentration of the MgCl₂ solution from the kiln concentrator 16. This solid MgCl₂—MgO product is dried and heated with steam in the decomposing furnace 18 to decompose the MgCl₂ and form MgO (o) and HCl as indicated in the following chemical equation:

$$MgCl_2 + H_2O = MgO + 2HCl$$

This operation is preferably carried out in a muffle type multiple hearth furnace, the MgCl₂—MgO product being passed through the furnace in counter-current to each other. At a temperature of 600° C.–650° C. the decomposition is rapid and complete. The HCl ($q1$) from the decomposing furnace 18 is condensed in the condenser 19 to form HCl solution ($a$) for leaching the ore as previously described. The MgO ($o$) is used for precipitating the metals as previously described. The amount of $MgCl_2$ thus recovered and decomposed is substantially chemically equivalent to the metals dissolved in the leaching operation, the HCl being used to dissolve the metals and the MgO to precipitate them from solution.

By the process described a substantially complete recovery of the Ag, Pb, Cd and Zn may be made with a minimum consumption of chemicals since the active reagents used in the process are regenerated and recovered in the process.

What is claimed is:

1. The process of treating marmatitic zinc ores and concentrates containing sulphides of manganese and other metals which consists in leaching said ores and concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating the pregnant solution to precipitate iron therefrom as ferrous chloride crystals, separating said crystals from the concentrated solution and heating said crystals with steam and air to decompose said crystals and form iron oxide and HCl and using said HCl to leach more ore and concentrate, diluting the concentrated solution separated from said ferrous chloride crystals and precipitating the residual iron and the manganese and other metals below zinc in the electromotive series with the aid of MgO to form $MgCl_2$ in solution, treating the solution from said last precipitation with MgO and $CO_2$ thereby precipitating the zinc therefrom as $ZnCO_3$, separating the $MgCl_2$ solution from the $ZnCO_3$ precipitate and concentrating said $MgCl_2$ solution and using part of said solution for leaching more ore and concentrate, concentrating the remainder of said solution to form a very concentrated $MgCl_2$ solution and mixing MgO with said last solution to form a solid $MgCl_2$—MgO product, heating said $MgCl_2$—MgO product with steam to decompose the $MgCl_2$ and form MgO and HCl, using said HCl for leaching more ore and concentrate and using said MgO for precipitating more zinc and other metals from solution, and for making more solid $MgCl_2$—MgO product.

2. The process of treating marmatitic zinc ores and concentrates containing sulphides of manganese and other metals which consists in leaching said ores and concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating the pregnant solution to precipitate iron therefrom as ferrous chloride crystals, separating said crystals from the concentrated solution and washing said crystals with concentrated $MgCl_2$ solution, heating said crystals with steam and air to decompose said crystals and form iron oxide and HCl and using said HCl to leach more ore and concentrate, diluting the concentrated solution separated from said ferrous chloride crystals and precipitating the residual iron and the manganese and other metals below zinc in the electromotive series with the aid of MgO to form $MgCl_2$ in solution, treating the solution from said last precipitations with MgO and $CO_2$ and thereby precipitating the zinc therefrom as $ZnCO_3$, separating the $MgCl_2$ solution from the $ZnCO_3$ precipitate and concentrating said $MgCl_2$ solution and using part of said solution for leaching more ore and concentrate and for washing precipitated ferrous chloride crystals, mixing MgO with the remainder of said solution and concentrating the remainder of said solution to form a very concentrated $MgCl_2$ solution and mixing MgO with said last solution to form a solid $MgCl_2$—MgO product, heating said $MgCl_2$—MgO product with steam to decompose the $MgCl_2$ and form MgO and HCl, using said HCl for leaching more ore and concentrate, and using said MgO for precipitating more zinc and other metals from solution and for making more solid $MgCl_2$—MgO product.

3. The process of treating marmatitic zinc ores and concentrates containing sulphides of manganese and other metals which consists in leaching said ores and concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating the pregnant solution to precipitate iron therefrom as ferrous chloride crystals, separating said crystals from the concentrated solution and washing said crystals with concentrated $MgCl_2$ solution, heating said crystals with steam and air to decompose said crystals and form iron oxide and HCl and using said HCl to leach more ore and concentrate, diluting the concentrated solution separated from said ferrous chloride crystals and precipitating the residual iron and the manganese and other metals below zinc in the electromotive series with the aid of MgO to form $MgCl_2$ in solution, treating the solution from said last precipitations with MgO and $CO_2$ thereby precipitating the zinc therefrom as $ZnCO_3$, separating the $MgCl_2$ solution from the $ZnCO_3$ precipitate and calcining said $ZnCO_3$ precipitate to form ZnO and $CO_2$ and using the $CO_2$ for precipitating more zinc as described, concentrating said $MgCl_2$ solution and using part of said solution for leaching more ore and concentrate and for washing precipitated ferrous chloride crystals, mixing MgO with the remainder of said solution and concentrating the remainder of said solution to form a very concentrated $MgCl_2$ solution, mixing MgO with said last solution to form a solid $MgCl_2$—MgO product, heating said $MgCl_2$—MgO product with steam to decompose the $MgCl_2$ and form MgO and HCl, using said HCl for leaching more ore and concentrate and using said MgO for precipitating more zinc and other metals from solution, and for making more solid $MgCl_2$—MgO product.

4. The process of treating marmatitic zinc ores and concentrates containing sulphides of manganese and of other metals which consists in leaching said ores and concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating the pregnant solution to precipitate the iron therefrom as ferrous chloride crystals, separating said crystals from the concentrated solution and washing said crystals with concentrated $MgCl_2$ solution, heating said crystals with steam and air to decompose said crystals and form iron oxide and HCl and using said HCl to leach more ore and concentrate, diluting the concentrated solution separated from said ferrous chloride crystals, precipitating from the diluted solution the residual iron and the manganese with MgO and chlorine and the other metals below zinc in the electromotive series with MgO and $H_2S$ to form $MgCl_2$ in solution, treating the solution from said last precipitations with MgO and $CO_2$ thereby precipitating the zinc therefrom as $ZnCO_3$, separating the $MgCl_2$ solution from the $ZnCO_3$ precipitate and calcining said $ZnCO_3$ precipitate to form ZnO and $CO_2$, using the $CO_2$ for precipitating more zinc as described, concentrating said $MgCl_2$ solution and using part of said solution for leaching more ore and concentrate and for washing precipitated ferrous chloride crystals, mixing MgO with the remainder of said solution and concentrating the remainder of said solution to form a very concentrated $MgCl_2$ solution, mixing MgO with said last solution to form a solid $MgCl_2$—MgO product, heating said $MgCl_2$—MgO product with steam to decompose the $MgCl_2$ and form MgO and HCl, using said HCl for leaching more ore and concentrate and using said MgO for precipitating more zinc and other metals from solution, and for making more solid $MgCl_2$—MgO product.

5. The process of treating marmatitic zinc ores and concentrates containing sulphides of manganese and of other metals which consists in leaching said ores or concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating said pregnant solution to precipitate iron therefrom as ferrous chloride crystals, separating said crystals from the solution and heating said crystals with steam and air to decompose said crystals and form iron oxide and HCl, using said HCl in the leaching of more ore or concentrate, diluting the concentrated solution separated from said ferrous chloride crystals and precipitating the residual iron and the manganese with MgO and chlorine and the other metals below zinc in the electromotive series with zinc metal, treating the solution from said last precipitations with MgO and $CO_2$ to precipitate the zinc therefrom as $ZnCO_3$, separating the $ZnCO_3$ from the $MgCl_2$ solution, concentrating said last $MgCl_2$ solution and using part of said solution for leaching more ore or concentrate, concentrating the remainder of said solution to a very concentrated $MgCl_2$ solution and mixing MgO with said last solution to form a solid $MgCl_2$—MgO product, heating said $MgCl_2$—MgO product with steam to decompose the $MgCl_2$ and form MgO and HCl, using said HCl for leaching more ore or concentrate and using said MgO for precipitating more zinc and other metals from solution and for making more solid $MgCl_2$—MgO product.

6. The process of treating marmatitic zinc ores and concentrates containing sulphides of manganese and of other metals which consists in leaching said ores or concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating said pregnant solution to precipitate iron therefrom as ferrous chloride crystals, separating said crystals from the solution and heating said crystals with steam and air to decompose said crystals and form iron oxide and HCl, using said HCl in the leaching of more ore or concentrate, diluting the concentrated solution separated from said ferrous chloride crystals and precipitating the residual iron and the manganese with MgO and chlorine and the other metals below zinc in the electromotive series with zinc metal, treating the solution from said last precipitations with MgO and $CO_2$ to precipitate the zinc therefrom as $ZnCO_3$, separating the $ZnCO_3$ from the $MgCl_2$ solution, calcining said $ZnCO_3$ to form ZnO and $CO_2$ and using said $CO_2$ for the precipitation of more $ZnCO_3$, concentrating said last $MgCl_2$ solution and using part of said solution for leaching more ore or concentrate, concentrating the remainder of said solution to a very concentrated $MgCl_2$ solution, mixing MgO with said last solution to form a solid $MgCl_2$—MgO product, heating said $MgCl_2$—MgO product with steam to decompose the $MgCl_2$ and form MgO and HCl, using said HCl for leaching more ore or concentrate and using said MgO for precipitating more zinc and other metals from solution and for making more solid $MgCl_2$—MgO product.

7. The process of treating marmatitic zinc ores and concentrates containing sulphides of manganese and of other metals which consists in leaching said ores or concentrates with HCl in a hot relatively concentrated $MgCl_2$ solution to dissolve the soluble sulphide minerals and drive off the sulphur as $H_2S$, separating the hot pregnant solution from the leached ore residue, heating and concentrating said pregnant solution to precipitate iron therefrom as ferrous chloride crystals, separating said crystals from the solution and washing said crystals with concentrated $MgCl_2$ solution, heating said crystals with steam and air to decompose said crystals and form iron oxide and HCl and using said HCl in the leaching of more ore or concentrate, diluting the concentrated solution separated from said ferrous chloride crystals and precipitating the residual iron and the manganese with MgO and chlorine and the other metals below zinc in the electromotive series with zinc metal, treating the solution from said last precipitations with MgO and $CO_2$ to precipitate the zinc therefrom as $ZnCO_3$, separating the $ZnCO_3$ from the $MgCl_2$ solution, concentrating said last $MgCl_2$ solution and using part of said solution for leaching more ore or concentrate and for washing more ferrous chloride crystals, concentrating the remainder of said solution to a very concentrated $MgCl_2$ solution and mixing MgO with said last solution to form a solid $MgCl_2$—MgO product, heating said $MgCl_2$—MgO product with steam to decompose the $MgCl_2$ and form MgO and HCl, using said HCl for leaching more ore or concentrate and using said MgO for precipitating more zinc and other metals from solution and for making more solid $MgCl_2$—MgO product.

8. The steps in the treatment of marmatitic zinc ores containing sulphide of manganese and of other metals which consists in leaching said ores with HCl in a hot relatively concentrated $MgCl_2$ solution to dissolve soluble sulphide minerals and drive off the sulphur as $H_2S$, separating the hot pregnant solution from the leached ore residue, heating and concentrating said pregnant solution to precipitate iron therefrom as ferrous chloride crystals, separating said crystals from the solution and washing said crystals with concentrated $MgCl_2$ solution, heating said crystals with steam and air to decompose said crystals and form iron oxide and HCl and using said HCl in the leaching of more ore or concentrate, diluting the concentrated solution separated from said ferrous chloride crystals and precipitating the residual iron and the manganese with MgO and chlorine and other metals below zinc in the electromotive series with zinc metal, treating the solution from said last precipitations with MgO and $CO_2$ to precipitate the zinc therefrom as $ZnCO_3$, separating the $ZnCO_3$ from the $MgCl_2$ solution, and calcining said $ZnCO_3$ to form ZnO and $CO_2$ and using said $CO_2$ for the precipitation of more $ZnCO_2$, concentrating said last $MgCl_2$ solution and using part of said solution for leaching more ore or concentrate and for washing more ferrous chloride crystals, concentrating the remainder of said solution to a very concentrated $MgCl_2$ solution and mixing MgO with said last solution to form a solid $MgCl_2$—MgO product, heating said $MgCl_2$—MgO product with steam to decompose the $MgCl_2$ and form MgO and HCl, using said HCl for leaching more ore or concentrate and using said MgO for precipitating more zinc and other metals from solution and for making more solid $MgCl_2$—MgO product.

9. The steps in the treatment of marmatitic zinc ores containing sulphide of manganese and of other metals which consists in leaching said ores with HCl in a hot relatively concentrated $MgCl_2$ solution to dissolve soluble sulphide minerals and drive off the sulphur as $H_2S$, separating the hot pregnant solution from the leached ore residue, heating and concentrating said pregnant solution to precipitate iron therefrom as ferrous chloride crystals, separating said crystals from the solution and washing said crystals with concentrated $MgCl_2$ solution, heating said crystals with steam and air to decompose said crystals and form iron oxide and HCl and using said HCl in the leaching of more ore or concentrate, diluting the concentrated solution separated from said ferrous chloride crystals and precipitating the residual iron and the manganese with MgO and chlorine and the other metals below zinc in the electromotive series with zinc metal, treating the solution from said last precipitations with MgO and $CO_2$ to precipitate the zinc therefrom as $ZnCO_3$, separating the $ZnCO_3$ from the $MgCl_2$ solution, and calcining said $ZnCO_3$ to form ZnO and $CO_2$ and using said $CO_2$ for the precipitation of more $ZnCO_3$, separating the $ZnCO_3$ from the $MgCl_2$ solution, concentrating said last $MgCl_2$ solution and using part of said solution for leaching more ore or concentrate and for washing more ferrous chloride crystals, concentrating the remainder of said solution to a very concentrated $MgCl_2$ solution and mixing MgO with said last solution to form a solid $MgCl_2$—MgO product, heating said $MgCl_2$—MgO product with steam to decompose the $MgCl_2$ and form MgO and HCl, using said HCl for leaching more ore or concentrate and using said MgO for precipitating more zinc and other metals from solution and for making more solid $MgCl_2$—MgO product.

10. In the process of leaching marmatitic zinc ores containing other metals with HCl in a $MgCl_2$ solution, the steps which consist in first precipitating the greater part of the iron as crystals of ferrous chloride by heating and evaporating the solution, thereafter precipitating all the metals except zinc and magnesium so as to recover the chlorine from said precipitated metals in solution as $MgCl_2$, thereafter precipitating the zinc therefrom with MgO and $CO_2$, then heating and evaporating said solution, mixing said evaporated solution with MgO to recover a solid $MgCl_2$—MgO product, heating said product with steam to decompose the $MgCl_2$ therein and form MgO and HCl and using said HCl and MgO over again in said process.

11. A process of recovering zinc values from marmatitic zinc ores comprising the steps of leaching the ores with HCl in a $MgCl_2$ solution to produce a solution of mixed chlorides, selectively separating iron chloride from said solution by heating and concentrating the same, and treating the remainder of said solution with MgO and $CO_2$, thereby forming $ZnCO_3$, and filtering the solution to recover the $ZnCO_3$ to separate zinc therefrom.

12. A process according to claim 11 in which the iron chloride is separated from the solution by selective crystallization.

13. A process of recovering zinc values from marmatitic zinc ores comprising the steps of leaching the ores with HCl in a $MgCl_2$ solution to produce a solution of mixed chlorides, selectively separating the iron chloride from said solution, treating the remainder of said solution with MgO and $CO_2$ thereby forming $ZnCO_3$ and $MgCl_2$, separating the $MgCl_2$ solution from the $ZnCO_3$, concentrating the $MgCl_2$ solution, and decomposing the same in the presence of steam to form MgO and HCl for reuse in the process as described.

14. A process according to claim 13 in which the $MgCl_2$ is concentrated in the presence of added MgO.

NIELS C. CHRISTENSEN.

REFERENCES CITED

The following references are of record in the file of this patent:

UNITED STATES PATENTS

| Number | Name | Date |
|---|---|---|
| 587,128 | Turner | July 27, 1897 |
| 1,463,483 | Nihoul | July 31, 1923 |
| 1,501,873 | Tyrer | July 15, 1924 |
| 1,572,268 | Christensen | Feb. 9, 1926 |
| 1,620,873 | Christensen | Mar. 15, 1927 |
| 1,639,610 | Mattenklodt | Aug. 16, 1927 |
| 2,363,572 | Christensen | Nov. 28, 1944 |

FOREIGN PATENTS

| Number | Country | Date |
|---|---|---|
| 23,543 | Great Britain | 1895 |